J. J. JOINES
FARE RECORDER.
APPLICATION FILED NOV. 22, 1911.

1,043,602.

Patented Nov. 5, 1912.
2 SHEETS—SHEET 1.

Witnesses
William R. Smith.
John J. McCarthy

Inventor
James J. Joines.

By Victor J. Evans
Attorney

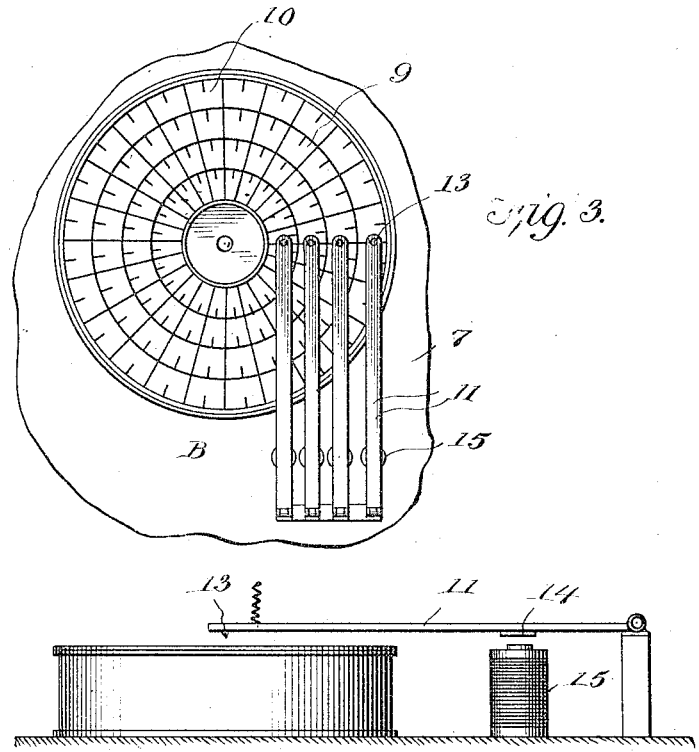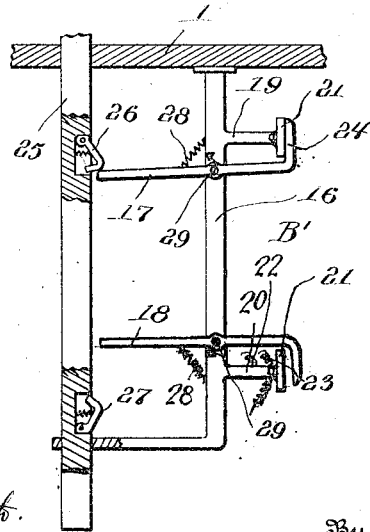

UNITED STATES PATENT OFFICE.

JAMES J. JOINES, OF ATLANTA, GEORGIA.

FARE-RECORDER.

1,043,602.   Specification of Letters Patent.   Patented Nov. 5, 1912.

Application filed November 22, 1911. Serial No. 661,733.

*To all whom it may concern:*

Be it known that I, JAMES J. JOINES, a citizen of the United States, residing at Atlanta, in the county of Fulton and State of Georgia, have invented new and useful Improvements in Fare-Recorders, of which the following is a specification.

This invention relates to improvements in fare recorders, and has for one of its objects to provide a combined recorder and register which may be readily applied to barber chairs, cabs or other vehicles or to any other like place which the customer or passenger is caused to occupy while being served, and which shall keep a continuous record, thereby indicating the exact time of occupancy of each separate passenger or customer and the period or length of such occupancy, the present application being in the nature of an improvement upon my former Patent, #896,550, dated Aug. 18, 1908.

Another object of the present invention is the provision of a recorder of this character which shall be operable from the seat, or seats, of the vehicle, upon a passenger occupying the seat, and arising therefrom.

To these ends the invention embodies an operating mechanism electrically connected with a recorder mechanism and operable in the downward and upward movement of the seat, incident to the passenger or customer occupying said seat or arising therefrom, to indicate on the recorder the occupancy of the seat, and the interval of time that the same has been occupied, respectively, the seat for this purpose embodying means adapted to actuate the operating mechanism in its downward movement so as to indicate the occupancy of the seat, the upward movement of the seat serving to actuate the operating mechanism to denote the rising of the passenger or customer, whereby the interval of time that the seat has been occupied will be registered.

With the above and other objects in view, the invention consists in the construction, combination and arrangement of parts, hereinafter described and falling within the scope of the appended claims.

Figure 1:
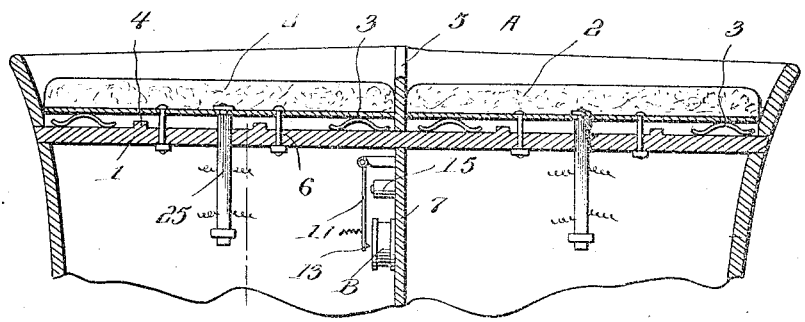
Figure 2:
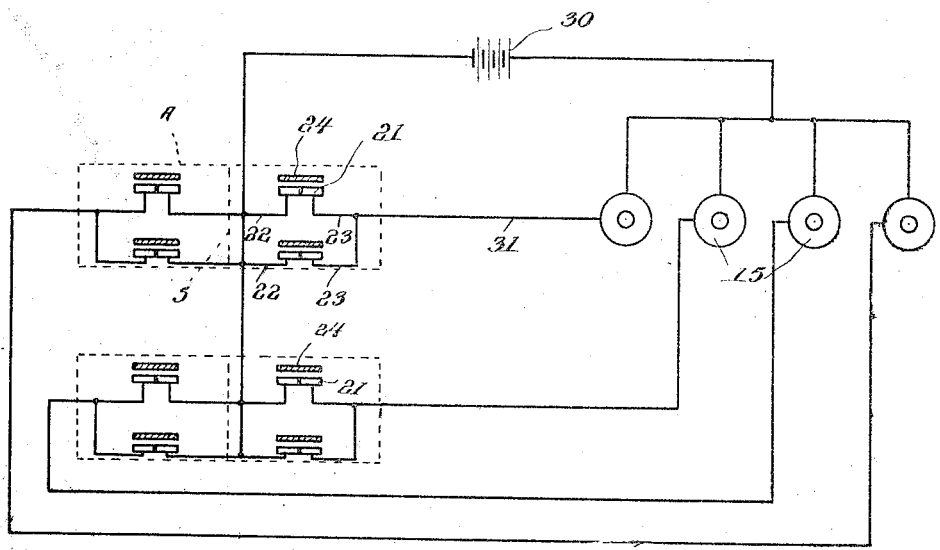

In the drawings forming a portion of this specification:—Figure 1 is a longitudinal sectional view of a double seat embodying the present invention. Fig. 2 is a transverse section on the line 2—2 of Fig. 1. Fig. 3 is a face view of the recording dial. Fig. 4 is a side view of the same. Fig. 5 is a diagrammatic view of the electric circuits.

Similar reference characters designate like parts throughout the several views.

Referring more particularly to the accompanying drawings wherein I have illustrated the preferred embodiment of my invention, the same is shown as applied to the seat of a vehicle, but of course it will be understood that it is not limited to such usage, as it may be employed for recording purposes wherever desired. In these drawings, A designates the vehicle seat, which as shown in Fig. 1 is a double one, it of course being understood that any desired number of seats may be employed. Each seat A comprises a stationary supporting member 1 having a cushion 2 mounted thereon. Adjacent the ends of the cushion 2 intermediate the same and the member 1 are springs 3 designed to support the cushions yieldingly so as to permit movement of the same relatively to the member 1 upon a passenger occupying the seat and leaving the same. Blocks or supports 4 are arranged upon the upper surface of the member 1 of the seat and serve to remove the weight from the springs and support the cushions when the seats are occupied. A division or partition 5 is placed intermediate the adjacent seats so that one person will not occupy more than one seat or cushion. The under surfaces of the cushions 2 are provided with retaining bolts 6 which latter are adapted to be passed through the member 1 to securely hold the cushions in place. For the purposes of illustration I have shown a partition 7 arranged below and intermediate adjacent seats on which is mounted a recording mechanism, designated at B, although I desire it to be understood that this mechanism may be mounted in any other suitable or convenient place so as to facilitate connection between the same and any desired number of seats. The recorder mechanism embodies a suitable clock work, having a revolving dial or face on which is mounted a circular chart 9, which latter serves as the record sheet. The chart 9 comprises a plurality of concentric strips or rings 10, four being shown in the drawings, each of which has connections with one of the seats A, as illustrated in Fig. 5 of the drawings. The rings 10 are divided into hour and minute intervals, as shown, and preferably show a period of twenty-four hours duration, although charts of greater or less recording capacity may be used according to different requirements.

Forwardly of the chart 9 and in alinement with the rings 10 are a plurality of levers 11, one for each ring, pivotally connected at their lower ends to a block 12 secured to the partition 7 below and at one side of the center line of the chart 9. Each of the levers 11 is provided at its free end with a pencil or punch 13 adapted to perforate one of the rings 10 in the movement of the lever. The levers 11 adjacent their pivotal connections are provided with armatures 14 designed to be attracted by magnets 15, whereby in the energization of the magnets, the levers 11 will be operated to perforate the recording rings of the chart, as will be more fully described.

Arranged beneath each seat A is an operating device B for the recorder mechanism. The operating means B comprises a standard 16 rigidly secured to the under surface or stationary member 1 of the seat, upon which are pivotally mounted, intermediate their lengths, switch levers 17 and 18, projecting laterally from the standards 16, and parallel with the levers 17 and 18, are arms 19 and 20, respectively, arranged above and below the respective levers 17 and 18. The outer ends of the arms 19 and 20 are provided with spaced contact members 21 having connection with conductors 22 and 23 and designed to be bridged by similar strips 24 arranged upon the levers 17 and 18 and projecting in relatively opposite directions and at right angles therefrom.

Each cover 2 of the seat is provided with an actuating plunger 25 arranged adjacent the free ends of the switch levers 17 and 18 and provided with spaced oppositely disposed spring pressed dogs 26 and 27 designed to engage the free ends of the levers 17 and 18, respectively. By virtue of this construction it will be seen that in the downward movement of the plunger 27 the dog 26 will engage the free end of the lever 17 to engage the contact strip 24 with the members 21, and the dog 27 will idle past the lever 18; and in the upward movement of the cushion under the action of the springs 3, the dog 27 will engage the free end of the lever 18 to engage the contact strip 24 with the contact members 21 on the arm 20, the dog 26 in the upward movement of the plunger idling past the lever 17, whereby one of the magnets will be energized to indicate on the recorder occupancy of the seat, and the vacating of the same, respectively. Adjacent their free ends the levers 17 and 18 are provided with retractile springs 28 to return the former to their normal positions subsequent to the action of the dog, the standard 16 being provided with stops 29 arranged at one side of the pivotal connection of the levers to limit the movement of the latter under the action of the springs.

One of the contact members of the arms 19 and 20 is connected with one terminal of a suitable source of energy, such as a battery 30, the opposite contact members of the arms being connected through the medium of a conductor 31 with one terminal of the magnet 15. The opposite terminals of the magnets are connected by means of a common conductor 32 with the free terminal of the battery 30.

In practice; when a seat is occupied, the plunger 25 thereof is pressed downwardly under the action of the cushion 2 and the dog 27 engaged with the free end of the lever 17 rocking the same upon its pivot in the downward movement of the plunger. In this movement of the parts the contact strip 24 is brought into engagement with the contact members 21 on the arm 19 to bridge the same and close the circuit through one of the magnets 15, whereby the lever 11 of the energized magnet will be rocked upon its pivot to perforate one of the rings 10 of the chart 9 to indicate the occupancy of the seat. When the passenger or customer arises from the seat, the cushion thereof is elevated through the action of the springs 3 and carries with it, in its upward movement, the plunger 25. In the upward movement of the plunger the dog 26 idles by the lever 17 and the dog 27 operatively engages the lever 18, rocking the same upon its pivot, to engage the contact strip 24 with the contact members 21 of the arm 20, thereby closing the circuit to the same magnet to actuate its arm 11 to perforate the ring 10 of the chart 9, thus denoting the interval of time that the customer has occupied the seat.

From the foregoing description, taken in connection with the accompanying drawings, it will be seen that I have provided a fare register wherein the downward movement of the seat serves to indicate on the recorder, the occupancy of such seat, and the upward movement of the seat serves to indicate on the recorder the vacancy of the former.

Having thus described the invention, what I claim and desire to secure by Letters Patent is:

1. The combination with a seat including a movable member and a stationary member, and a recorder mechanism, of an actuating mechanism for said recorder mechanism, said actuating mechanism comprising a standard secured to the stationary member of the seat, a plurality of contacts carried by said standard, means pivotally mounted on the standard for engaging said contacts, a plunger connected to the movable member of the seat and movable therewith and adapted to actuate the said means alternately, a circuit leading from said contacts and a source of energy therein, and means adapted to be energized from said circuit to actuate said recorder mechanism.

2. The combination with a seat including a movable member and a stationary member, and a recorder mechanism, of a standard secured to the stationary member of the seat, a plurality of contacts carried by said standard, a circuit including said contacts and having a source of energy therein, means in said circuit adapted to be energized to actuate said recorder mechanism, a switch lever pivotally mounted upon said standard adjacent each of said contact members and adapted for engagement with the latter, a plunger carried by the movable member of the seat and movable therewith, and a pair of spring pressed dogs carried by said plunger and adapted to engage said levers one in the downward and the other in the upward movement of the movable member of the seat to close the circuit to actuate said recorder mechanism.

3. The combination with a seat including a movable member and a stationary member, and a recorder mechanism, of a standard secured to the stationary member of the seat, a plurality of contacts carried by said standard, an electric circuit including said contacts and having a source of energy therein, means in said circuit and adapted to be energized to actuate the recorder mechanism, a switch lever pivotally mounted upon said standard adjacent each of said contacts, a plunger carried by the movable member of the seat, a pair of spring pressed dogs on said plunger and adapted to actuate the said levers one in the downward and the other in the upward movement of the movable member of the seat to close the circuit to actuate the said recorder mechanism, means for restoring the levers to their normal positions subsequent to the action of the dogs, and means for limiting the movement of said levers under the action of the last means.

In testimony whereof I affix my signature in presence of two witnesses.

JAMES J. JOINES.

Witnesses:
JAS. G. WORK,
JOHN H. BOSTON, Jr.